United States Patent
Yoshioka

(10) Patent No.: US 8,325,241 B2
(45) Date of Patent: Dec. 4, 2012

(54) IMAGE PICKUP APPARATUS THAT STORES ADJACENT AND CONTIGUOUS PIXEL DATA BEFORE INTEGRATION OF SAME

(75) Inventor: Shigeatsu Yoshioka, Kanagawa (JP)

(73) Assignee: Sony Corporation, Tokyo (JP)

( * ) Notice: Subject to any disclaimer, the term of this patent is extended or adjusted under 35 U.S.C. 154(b) by 360 days.

(21) Appl. No.: 12/656,163

(22) Filed: Jan. 20, 2010

(65) Prior Publication Data

US 2010/0194921 A1 Aug. 5, 2010

(30) Foreign Application Priority Data

Feb. 5, 2009 (JP) ................................. 2009-024469

(51) Int. Cl.
*H04N 5/225* (2006.01)
*H04N 3/14* (2006.01)
*H04N 5/335* (2006.01)
*H04N 5/232* (2006.01)

(52) U.S. Cl. .............. 348/207.99; 348/340; 348/231.99; 348/272; 348/302; 348/345

(58) Field of Classification Search .......... 348/340, 348/345, 349, 335, 207.99, 231.3, 231.6, 348/231.9, 231.99, 222.1, 272, 277, 302
See application file for complete search history.

(56) References Cited

U.S. PATENT DOCUMENTS

| | | | | |
|---|---|---|---|---|
| 6,097,394 A | * | 8/2000 | Levoy et al. | 382/154 |
| 7,932,941 B2 | * | 4/2011 | Hayasaka et al. | 348/272 |
| 7,936,392 B2 | * | 5/2011 | Ng et al. | 348/349 |
| 8,102,459 B2 | * | 1/2012 | Hayasaka et al. | 348/335 |
| 8,106,994 B2 | * | 1/2012 | Ichimura | 348/340 |
| 2007/0230944 A1 | * | 10/2007 | Georgiev | 396/322 |
| 2007/0252074 A1 | * | 11/2007 | Ng et al. | 250/208.1 |
| 2010/0265385 A1 | * | 10/2010 | Knight et al. | 348/340 |

FOREIGN PATENT DOCUMENTS

| | | |
|---|---|---|
| JP | 2007-128009 A | 5/2007 |
| JP | 2008-182692 A | 8/2008 |

(Continued)

OTHER PUBLICATIONS

Japanese Office Action issued Dec. 8, 2010 for corresponding Japanese Application No. 2009-024469.

(Continued)

*Primary Examiner* — Nhan T Tran
(74) *Attorney, Agent, or Firm* — Rader Fishman & Grauer, PLLC

(57) ABSTRACT

An image pickup apparatus includes: an image pickup lens; an image pickup device; a microlens array; an image processing section; and a data storage section, in which the image processing section produces a plurality of arbitrary viewpoint images based on image pickup data obtained by the image pickup device by synthesizing pixel data extracted from pixels located at the same position in image regions each of which corresponds to each of microlenses included in the microlens array, and the arbitrary viewpoint images are stored in the data storage section, and a plurality of pixel data recorded at pixel positions adjacent to one another are collectively read out as a read-out unit from each of the arbitrary viewpoint images stored in the data storage section, and a predetermined sorting process and a predetermined integration process are performed on the pixel data read out, thereby the refocus image is produced.

5 Claims, 12 Drawing Sheets

FOREIGN PATENT DOCUMENTS

| | | |
|---|---|---|
| JP | 2008-219878 A | 9/2008 |
| JP | 2008-304331 A | 12/2008 |
| JP | 2009-021683 A | 1/2009 |
| WO | WO-2006/039486 | 4/2006 |

OTHER PUBLICATIONS

R. Ng et al., "Light Field Photography with a Hand-Held Plenoptic Camera," Stanford Tech Report CTSR Feb. 2005, pp. 1-11.

* cited by examiner

IMAGE PICKUP APPARATUS THAT STORES ADJACENT AND CONTIGUOUS PIXEL DATA BEFORE INTEGRATION OF SAME

BACKGROUND OF THE INVENTION

1. Field of the Invention

The present invention relates to an image pickup apparatus using an image pickup lens and an image pickup device.

2. Description of the Related Art

Various image pickup apparatuses have been heretofore proposed and developed. An image pickup apparatus performing predetermined image processing on image pickup data obtained by picking up an image to output the processed image pickup data has been also proposed.

For example, International Patent Publication No. 06/039486 and Ren.Ng, et al. "Light Field Photography with a Hand-Held Plenoptic Camera", Stanford Tech Report CTSR 2005-02 each propose an image pickup apparatus using a technique called "Light Field Photography". The image pickup apparatus includes an image pickup lens as a main lens, a microlens array and an image pickup device in which a plurality of pixels are two-dimensionally arranged. Moreover, a plurality of pixels are allocated to one microlens, and image pickup data obtained from the image pickup device includes the intensity distribution of light on a light-receiving plane as well as information on the traveling direction of the light. Thereby, an image processing section is allowed to reconstruct an image viewed from an arbitrary viewpoint or direction (hereinafter simply referred to as "field of view") or an arbitrary focus (focal point).

SUMMARY OF THE INVENTION

In image pickup data obtained by such a technique, information eventually displayed as one pixel is divided into a plurality of pixels according to the traveling direction of light, and then stored. Therefore, typically, when a high-definition image is attempted to be obtained, the amount of the image pickup data becomes enormous.

Therefore, to reconstruct an image (a refocus image) from an arbitrary focal point, a large amount of data is transferred from a storage device storing the image pickup data during such a process. In addition, as described above, information eventually corresponding to one pixel is divided into a plurality of pixels, and then stored, so it is necessary to collect pixel data from discrete addresses on the storage device which are calculated based on a focus position. In this case, each pixel data does not have locality, so it is difficult to reduce the number of data transfers with a cache memory or the like. Moreover, even if data is transferred through, for example, a DMA (Direct Memory Access), in the case where data are transferred from non-consecutive addresses, compared to the case where data are transferred from consecutive addresses, a much larger number of cycles are necessary.

Thus, in the image pickup apparatus in related art, in the case where an image (refocus image) set from an arbitrary focal point is produced based on image pickup data obtained so as to also include information on the traveling direction of a light ray, it takes time to produce such an image. Therefore, it is desired to produce an image at higher speed.

It is desirable to provide an image pickup apparatus allowed to produce an image set from an arbitrary focal point based on image pickup data obtained so as to also include information on the traveling direction of a light ray at higher speed than that in related art.

According to an embodiment of the invention, there is provided an image pickup apparatus including: an image pickup lens; an image pickup device obtaining image pickup data based on light received; a microlens array including a plurality of microlenses, and arranged on a focal plane of the image pickup lens between the image pickup lens and the image pickup device, each of the microlenses being provided corresponding to a plurality of pixels of the image pickup device; an image processing section performing predetermined image processing so as to produce a reconstructed image based on the image pickup data obtained from the image pickup device; and a data storage section for storing image pickup data during image processing by the image processing section. Moreover, when the above-described image processing section produces a refocus image as a reconstructed image set from an arbitrary focal point based on the image pickup data, a plurality of arbitrary viewpoint images are produced based on the image pickup data by synthesizing pixel data extracted from pixels located at the same position in image regions each of which corresponds to each of the microlenses, and the arbitrary viewpoint images are stored in the data storage section, and a plurality of pixel data recorded at pixel positions adjacent to one another are collectively read out as a read-out unit from each of the arbitrary viewpoint images stored in the data storage section, and a predetermined sorting process and a predetermined integration process are performed on the pixel data read out, thereby the refocus image is produced.

In the image pickup apparatus according to the embodiment of the invention, image pickup data including the traveling direction of a light ray is obtained by the above-described image pickup lens, the above-described microlens array and the above-described image pickup device, and predetermined image processing is performed so as to produce a reconstructed image based on the image pickup data. At this time, image pickup data during the image processing is stored in the data storage section. To produce the above-described refocus image based on the image pickup data, the above-described plurality of arbitrary viewpoint images are produced based on the image pickup data, and the plurality of arbitrary viewpoint images are stored in the data storage section. Then, a plurality of pixel data recorded at positions adjacent to one another are collectively read out from each of the arbitrary viewpoint images stored in the data storage section, and a predetermined sorting process and a predetermined integration process are performed on these pixel data read out so as to produce the above-describe refocus image. The plurality of arbitrary viewpoint images are produced based on the image pickup data to be stored in the data storage section in such a manner, and then a plurality of pixel data recorded at pixel positions adjacent to one another are collectively read out from each of the arbitrary viewpoint images, thereby the number of data transfers (the number of data transfer cycles) from the data storage section which are necessary to produce the refocus image is smaller than that in related art.

In the image pickup apparatus according to the embodiment of the invention, to produce the refocus image based on the image pickup data obtained from the image pickup device, a plurality of arbitrary viewpoint images are produced based on image pickup data to be stored in the data storage section, and then a plurality of pixel data recorded at pixel positions adjacent to one another are collectively read out from each of the arbitrary viewpoint images. Therefore, the number of data transfers necessary to produce the refocus image based on such a plurality of pixel data is smaller than that in related art. Therefore, an image (a refocus image) set from an arbitrary focal point is allowed to be produced based on the image pickup data obtained so as to also include information on the traveling direction of a light ray at higher speed than that in related art.

Other and further objects, features and advantages of the invention will appear more fully from the following description.

DETAILED DESCRIPTION OF THE PREFERRED EMBODIMENTS

Figure 1:
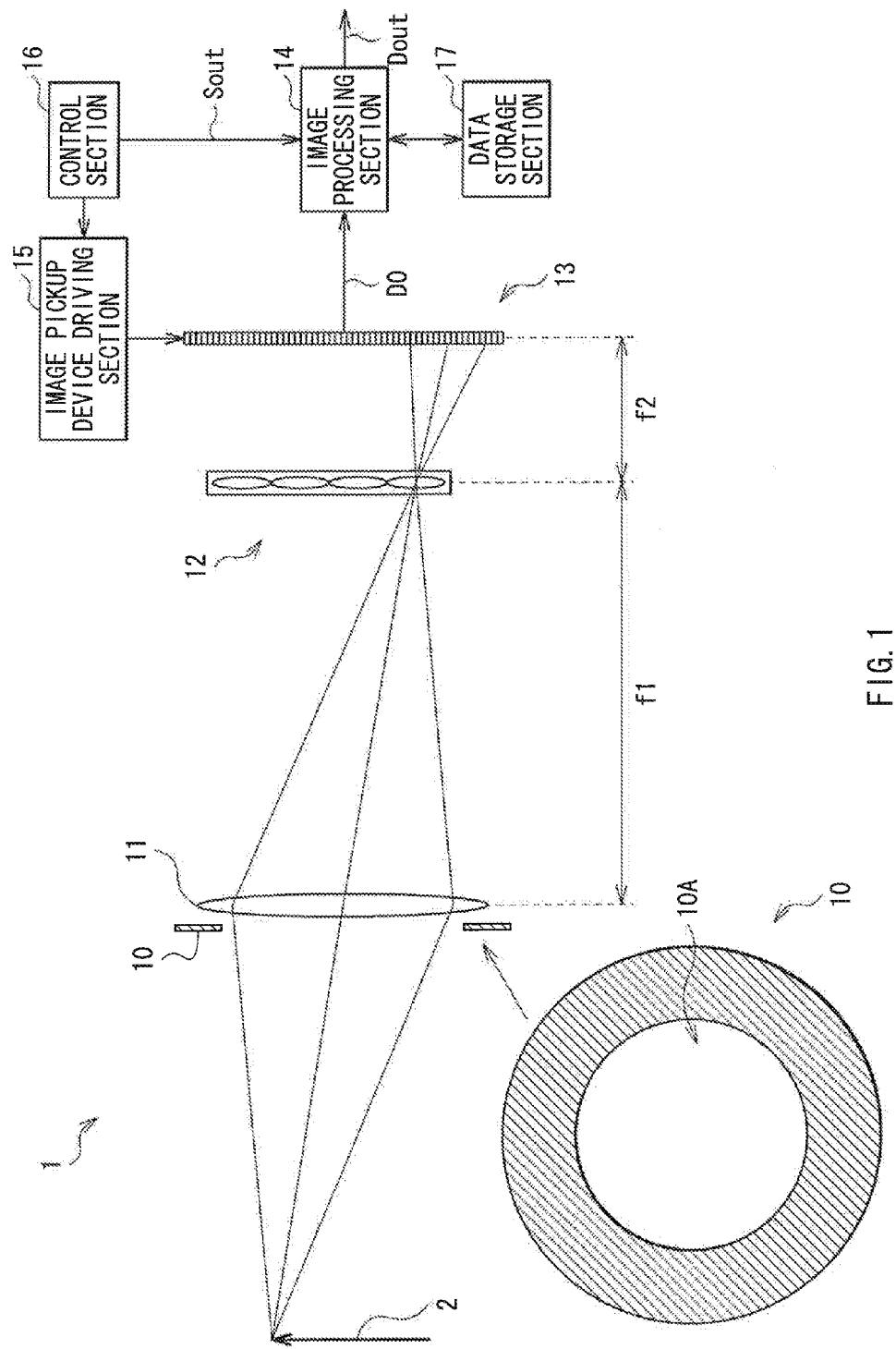
FIG. 1 is an illustration of the whole configuration of an image pickup apparatus according to an embodiment of the invention.

A preferred embodiment will be described in detail below referring to the accompanying drawings. Descriptions will be given in the following order.
1. Embodiment (an example of high-speed refocusing arithmetic processing using an arbitrary viewpoint image)
2. Application example of image pickup apparatus (Application Example 1: digital camera, Application Example 2: three-dimensional display)
3. Modification 1. Embodiment Whole Configuration Example of Image Pickup Apparatus FIG. 1 illustrates the whole configuration of an image pickup apparatus (an image pickup apparatus 1) according to an embodiment of the invention. The image pickup apparatus 1 picks up an image of an image pickup object (an object) 2 to output image data Dout. The image pickup apparatus 1 includes an aperture stop 10, an image pickup lens 11, a microlens array 12 and an image pickup device 13 in order from the object 2. In addition, the image pickup apparatus 1 further includes an image processing section 14, an image pickup device driving section 15, a control section 16 and a data storage section 17.

The aperture stop 10 is an optical aperture stop of the image pickup lens 11. The shape of an aperture 10A of the aperture stop 10 is, for example, circular as illustrated in FIG. 1, and an image (a unit image which will be described later), which has a shape similar to the shape of the aperture of the aperture stop 10, of the image pickup object 2 is formed on the image pickup device 13 in each of microlenses.

The image pickup lens 11 is a main lens for picking up an image of the object 2, and is configured of, for example, a typical image pickup lens used in a video camera, a still camera or the like.

The microlens array 12 is configured of a plurality of microlenses which are two-dimensionally arranged, and is arranged on a focal plane (an image forming plane; a reference numeral f1 in the drawing represents the focal length of the image pickup lens 11) of the image pickup lens 11. Each microlens has, for example, a circular planar shape, and is configured of, for example, a solid lens, a liquid crystal lens, a diffractive lens or the like.

Figure 2A:
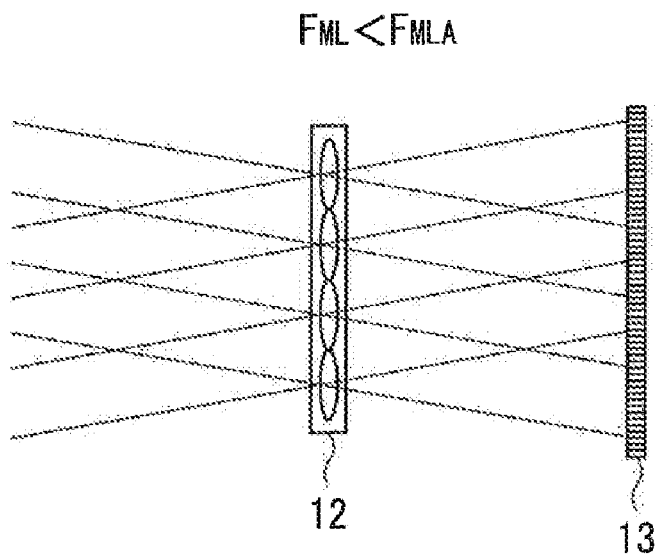
FIGS. 2A and 2B are illustrations for describing setting of F-numbers of an image pickup lens and a microlens array.
Figure 2B:
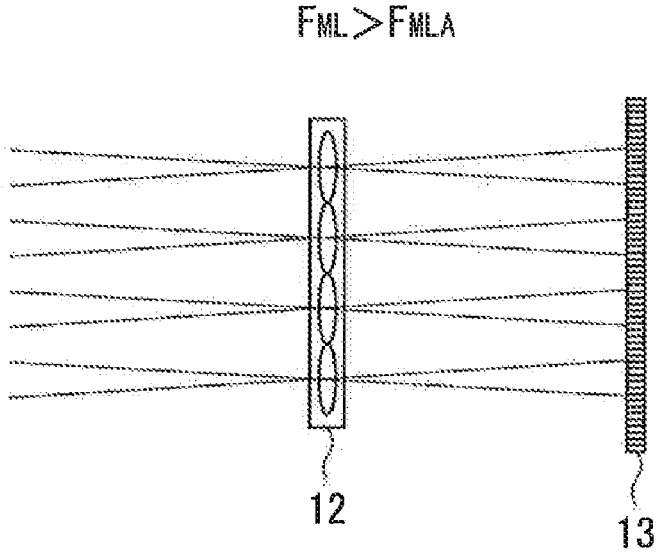

In this case, the F-number $F_{ML}$ of the image pickup lens 11 and the F-number $F_{MLA}$ of the microlens array 12 are preferably substantially equal to each other. As illustrated in FIG. 2A, in the case where the F-number $F_{ML}$ of the image pickup lens 11 is smaller than the F-number $F_{MLA}$ of the microlens array 12 ($F_{ML}<F_{MLA}$), image pickup light rays from adjacent microlenses overlap one another. When the image pickup light rays overlap one another in such a manner, crosstalk occurs, thereby to cause degradation in image quality of a reconstructed image. On the other hand, as illustrated in FIG. 2B, in the case where the F-number $F_{ML}$ of the image pickup lens 11 is larger than the F-number $F_{MLA}$ of the microlens array 12 ($F_{ML}>F_{MLA}$), some image pickup pixels do not receive image pickup light rays from the microlenses. When such image pickup pixels are present, it is difficult to sufficiently use the image pickup pixels, and the number of pixels in the reconstructed image is reduced. The invention is not limited to the case where these F-numbers are exactly equal to each other, and may include the case where these F-numbers have an error or the like.

The image pickup device 13 receives light from the microlens array 12 to obtain image pickup data D0, and is arranged on a focal plane (a reference numeral f2 in the drawing represents the focal length of the microlens array 12) of the microlens array 12. The image pickup device 13 includes a plurality of pixels (pixels P which will be described later) which are two-dimensionally arranged in a matrix form, and each of the pixels is configured of, for example, a CCD (Charge Coupled Device), a CMOS (Complementary Metal-Oxide Semiconductor) or the like.

On a light-receiving plane (a plane closer to the microlens array 12) of such an image pickup device 13, a number M×N (M and N each are an integer) of pixels are arranged in a matrix form, and a plurality of pixels are allocated to one microlens in the microlens array 12. The number of pixels on the light-receiving plane is, for example, M×N=3720× 2520=9374400. In this case, the number of pixels (m×n) allocated to one microlens is resolution of a reconstructed image which will be described later from an arbitrary field of view. Therefore, the resolution of the reconstructed image from an arbitrary field of view or an arbitrary focus increases with an increase in values m and n. On the other hand, as values (M/m) and (N/n) are the number of pixels (resolution) of the reconstructed image, the number of pixels in the reconstructed image increases with an increase in the values (M/m) and (N/n). Therefore, there is a trade-off relationship between the resolution of the reconstructed image from an arbitrary field of view and the number of pixels.

The image processing section 14 performs predetermined image processing on image pickup data D0 obtained from the image pickup device 13 in response to a control signal Sout supplied from the control section 16 which will be described later so as to produce and output image pickup data Dout. More specifically, the image processing section 14 performs, for example, arithmetic processing (a predetermined sorting process or the like) using a technique called "Light Field Photography" so as to produce a viewed image (a reconstructed image) set from an arbitrary field of view or an arbitrary focal plane. The configuration of the image processing section 14 will be described in detail later (refer to FIG. 3).

The data storage section 17 is a storage section for storing image pickup data during the above-described image processing by the image processing section 14. The data storage section 17 is configured of, for example, any of various memories such as a DRAM (Dynamic Random Access Memory) or a SRAM (Static Random Access Memory).

The image pickup device driving section 15 drives the image pickup device 13, and controls the light-receiving operation of the image pickup device 13.

The control section 16 controls the operations of the image processing section 14 and the image pickup device driving section 15, and is configured of, for example, a microcomputer or the like.

Specific Configuration Example of Image Processing Section

Figure 3:
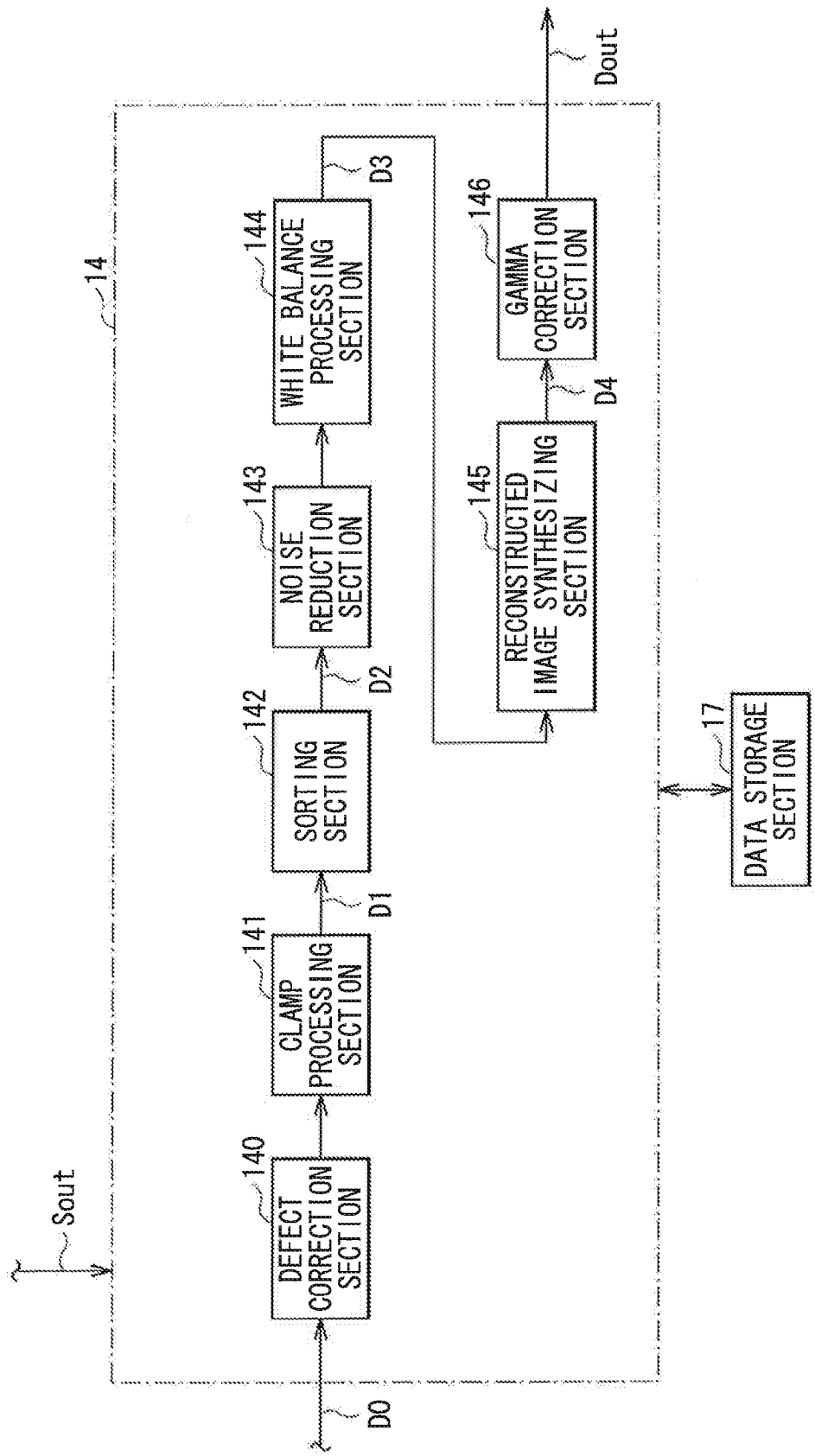
FIG. 3 is a functional block diagram illustrating a specific configuration of an image processing section illustrated in FIG. 1.

Next, referring to FIG. 3, a specific configuration of the image processing section 14 will be described below. FIG. 3 illustrates a functional block configuration of the image processing section 14 with the data storage section 17. The image processing section 14 includes a defect correction section 140, a clamp processing section 141, a sorting section 142, a noise reduction section 143, a white balance processing section 144, a reconstructed image synthesizing section 145 and a gamma correction section 146.

The defect correction section 140 corrects a defect such as loss or invalidity included in the image pickup data D0 obtained from the image pickup device 13 (a defect caused by an abnormality in the image pickup device 13).

The clamp processing section 141 performs a process (clamp processing) of setting the black level of each pixel data on image pickup data obtained by defect correction by the defect correction section 140.

The sorting section 142 performs a predetermined sorting process on image pickup data (image data) D1 supplied from the clamp processing section 142 so as to obtain image pickup data (image data) D2 including a plurality of arbitrary viewpoint images corresponding to images from a plurality of viewpoints. Such arbitrary viewpoint images are produced by synthesizing pixel data extracted from pixels P located at the same position in unit images (images in reconstructed pixel regions 13D which will be described later) received on the image pickup device 13. Therefore, the number of produced arbitrary viewpoint images is equal to the number of pixels allocated to one microlens.

In the embodiment, each of the arbitrary viewpoint images produced in such a manner is stored in the data storage section 17 so that in each of the arbitrary viewpoint images, pixel data (a plurality of pixel data) from a plurality of pixels P are recorded in pixel positions adjacent to one another. Thereby, in refocusing arithmetic processing by the reconstructed image synthesizing section 145 which will be described later, the number of data transfer cycles is reduced, compared to related art. In addition, the sorting section 142 corresponds to a specific example of "an arbitrary viewpoint image producing section" in the invention. Such arbitrary viewpoint images will be described in detail later (refer to FIGS. 10 to 12).

The noise reduction section 143 performs a process of reducing noise (for example, noise generated when an image is picked up in a dark place or a place with insufficient sensitivity) included in the image pickup data D2 supplied from the sorting section 142.

The white balance processing section 144 performs a white balance adjustment process on image pickup data supplied from the noise reduction section 143 so as to produce image pickup data D3. Examples of such a white balance adjustment process include a process of adjusting color balance affected by an individual difference among devices such as a difference in transmission characteristics of a color filter or a difference in spectral sensitivity of the image pickup device 13, illumination conditions, or the like. In addition, a color interpolation process such as a demosaic process may be performed on image pickup data subjected to the white balance process.

The reconstructed image synthesizing section 145 performs a predetermined synthesization process, for example, refocusing arithmetic processing using a technique called "Light Field Photography" on the image pickup data D3 supplied from the white balance processing section 144. Then, a reconstructed image (image pickup data D4) as a refocus image is produced by such a synthesization process.

In such refocusing arithmetic processing, in the embodiment, a plurality of pixel data recorded in the pixel positions adjacent to one another are collectively read out from each of the arbitrary viewpoint images stored in the data storage section 17. Then, a predetermined sorting process and a predetermined integration process are performed on these pixel data read out to produce the above-described refocus image. More specifically, in the synthesization process, a plurality of pixel data are sequentially transferred from each of arbitrary viewpoint images a number of times equivalent to the number of arbitrary viewpoint images, and the integration process is performed on each of the pixel data. In addition, the reconstructed image synthesizing section 145 corresponds to a specific example of "a refocus image producing section" in the invention. Such refocusing arithmetic processing will be described in detail later (refer to FIG. 6 and FIGS. 10 to 12).

The gamma correction section 146 performs predetermined gamma correction (tone or contrast correction) on the image pickup data D4 supplied from the reconstructed image synthesizing section 145 so as to produce the image pickup data Dout.

Functions and Effects of Image Pickup Apparatus

Next, functions and effects of the image pickup apparatus 1 according to the embodiment will be described below.

Basic Functions of Image Pickup Apparatus

First, referring to FIGS. 1 to 6, basic functions of the image pickup apparatus 1 will be described below.

Figure 4:
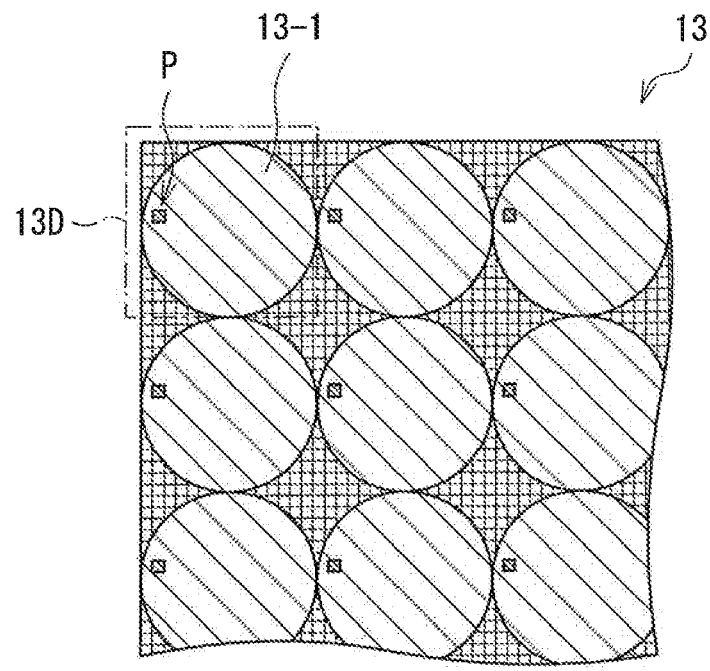
FIG. 4 is a plan view of a light-receiving region on an image pickup device illustrated in FIG. 1.

In the image pickup apparatus 1, as illustrated in FIG. 4, the luminous flux of an image of the object 2 by the image pickup lens 11 is narrowed by the aperture stop 10, and then the image of the object 2 is formed on the microlens array 12. Then, incident light rays to the microlens array 12 pass through the microlens array 12 to be received by the image pickup device 13. At this time, the incident light rays to the microlens array 12 are received at different positions (different pixels P) on the image pickup device 13 depending on the traveling direction of the incident light rays. More specifically, for example, as illustrated in FIG. 4, an image (a unit image) 13-1, which has a shape similar to the aperture shape (in this case a circular shape) of the aperture stop 10, of the image pickup object 2 is formed for each of microlenses. In addition, the unit image 13-1, that is, a region (a reconstructed pixel region 13D) configured of the pixels P allocated to one microlens corresponds to one pixel of a reconstructed image.

Figure 5:
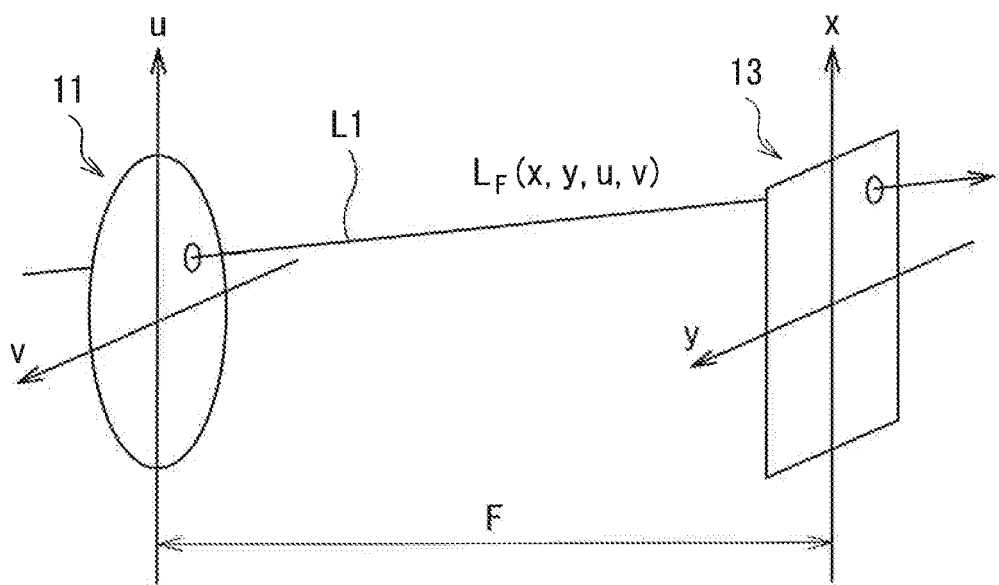
FIG. 5 is an illustration for describing information about a light ray entering into the image pickup device.

Now, referring to FIG. 5, a light ray received by the image pickup device 13 will be described below. First, a rectangular coordinate system (u, v) is defined on an image pickup lens plane of the image pickup lens 11, and a rectangular coordinate system (x, y) is defined on an image pickup plane of the image pickup device 13. A distance between the image pickup lens plane of the image pickup lens 11 and the image pickup plane of the image pickup device 13 is defined as "F". Then, a light ray L1 passing through the image pickup lens 11 and the image pickup device 13 as illustrated in the drawing is represented by a four-dimensional function $L_F(x, y, u, v)$. Therefore, information on the traveling direction of the light ray L1 as well as information on the position of the light ray L1 is recorded into the image pickup device 13. That is, the incident direction of the light ray is determined by the arrangement of the plurality of pixels P allocated to each microlens, thereby the image pickup data D0 including the traveling direction of a light ray is obtained.

When light is received by the image pickup device 13 in such a manner, the image pickup data D0 is obtained from the image pickup device 13 in response to a drive operation by the image pickup device driving section 15, and the image pickup data D0 is inputted into the image processing section 14. The image processing section 14 performs predetermined image processing (a sorting process) on the image pickup data D0 in response to control by the control section 16. For example, to reconstruct an image from an arbitrary field of view (the arbitrary viewpoint image), a process of synthesizing pixel data extracted from pixels located at the same position in regions each of which corresponds to each of microlenses is performed. Moreover, to reconstruct an image from an arbitrary focal point (focus), the sorting process and the integration process are performed on the pixel data. At this time, image pickup data is temporarily stored in the data storage section 17 during the image processing. The reconstructed image from an arbitrary field of view or an arbitrary focal point is outputted as the image pickup data Dout by such image processing.

More specifically, when the image pickup data D0 is inputted into the image processing section 14 in the embodiment, first, the defect correction section 140 performs defect correction, and then the clamp processing section 142 performs clamp processing. Next, the sorting section 142 performs the sorting process, and then the noise reduction section 143 performs the noise reduction process, and the white balance processing section 144 performs the white balance process.

Thereby, the image pickup data D3 is inputted into the reconstructed image synthesizing section 145.

Next, as described above, the reconstructed image synthesizing section 145 performs the sorting process using, for example, a technique called "Light Field Photography", and the integration process (refocusing arithmetic processing) on the image pickup data D3 to produce the reconstructed image (the image pickup data D4).

Figure 6:
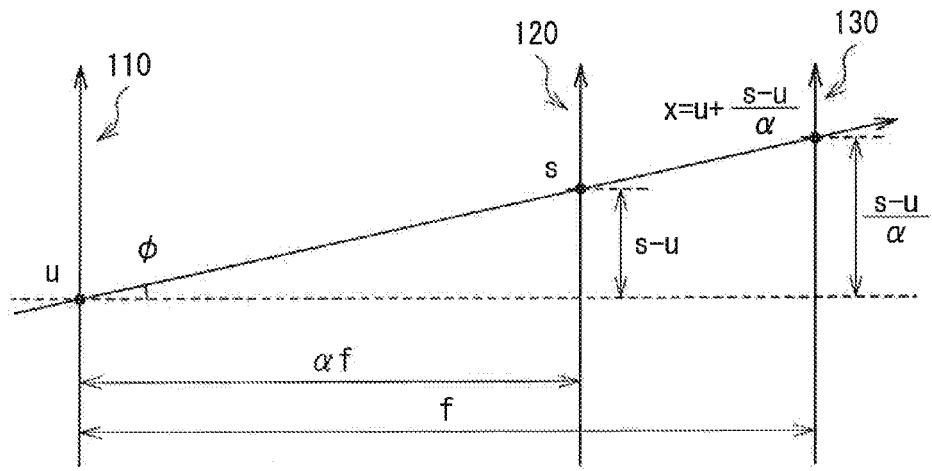
FIG. 6 is an illustration for describing refocusing arithmetic processing by a reconstructed image synthesizing section illustrated in FIG. 3.

More specifically, as illustrated in FIG. 6, detection strength $L_{F'}$ on an image pickup plane 130 of coordinates (s, t) on a refocus plane 120 defined by a refocus factor α is represented by the following formula (1). Moreover, an image $E_{F'}(s, t)$ obtained on the refocus plane 120 is a value obtained by integrating the above-described detection intensity $L_{F'}$ with respect to a lens aperture, so the image $E_{F'}(s, t)$ is represented by the following formula (2). Therefore, a refocusing arithmetic processing is performed based on the formula (2) so as to reconstruct an image (a refocus image) set from an arbitrary focal point (the refocus plane 120 defined by the refocus factor α). In addition, the image pickup lens plane 110 in the drawing represents an image pickup lens plane of the image pickup lens 11.

Mathematical Formula 1

$$L_{F'}(s, t, u, v) = L_{(\alpha \cdot F)}(s, t, u, v) \quad (1)$$
$$= L_F\left(u + \frac{s-u}{\alpha}, v + \frac{t-v}{\alpha}, u, v\right)$$
$$= L_F\left\{u\left(1 - \frac{1}{\alpha}\right) + \frac{s}{\alpha}, v\left(1 - \frac{1}{\alpha}\right) + \frac{t}{\alpha}, u, v\right\}$$

$$E_{F'}(s, t) = \frac{1}{F'^2} \int\int L_{F'}(s, t, u, v) du dv \quad (2)$$
$$= \frac{1}{\alpha^2 F^2} \int\int L_F\left\{u\left(1 - \frac{1}{\alpha}\right) + \frac{s}{\alpha}, v\left(1 - \frac{1}{\alpha}\right) + \frac{t}{\alpha}, u, v\right\} du dv$$

Then, the gamma correction section 149 performs gamma correction on data of the reconstructed image (image pickup data D4) produced in such a manner. Thereby, the image pickup data Dout is produced, and then outputted from the image processing section 14.

Characteristic Functions in Image Pickup Apparatus

Figure 7:
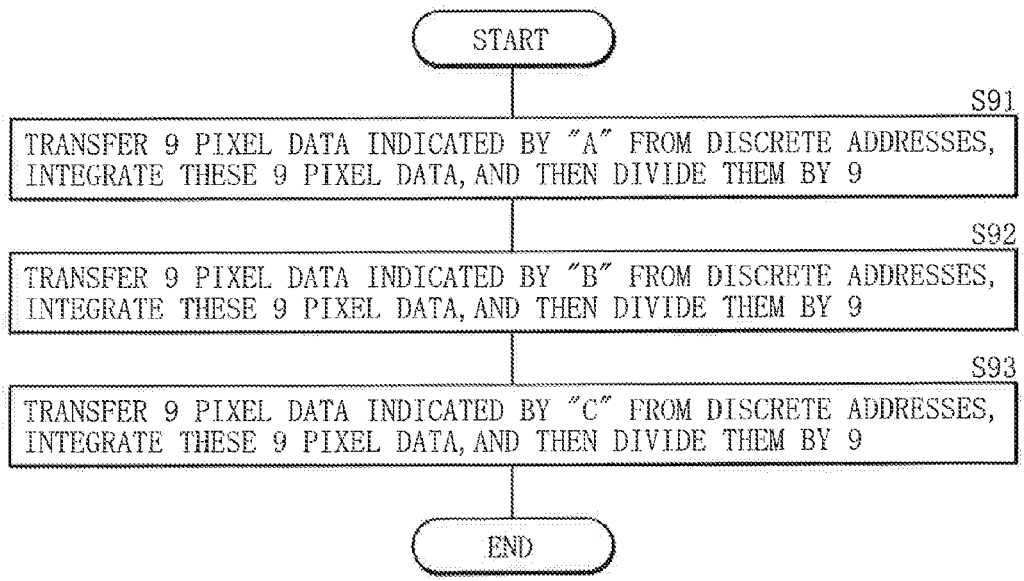
FIG. 7 is a flow chart of an example of refocusing arithmetic processing in an image pickup apparatus in related art according to a comparative example.
Figure 8:
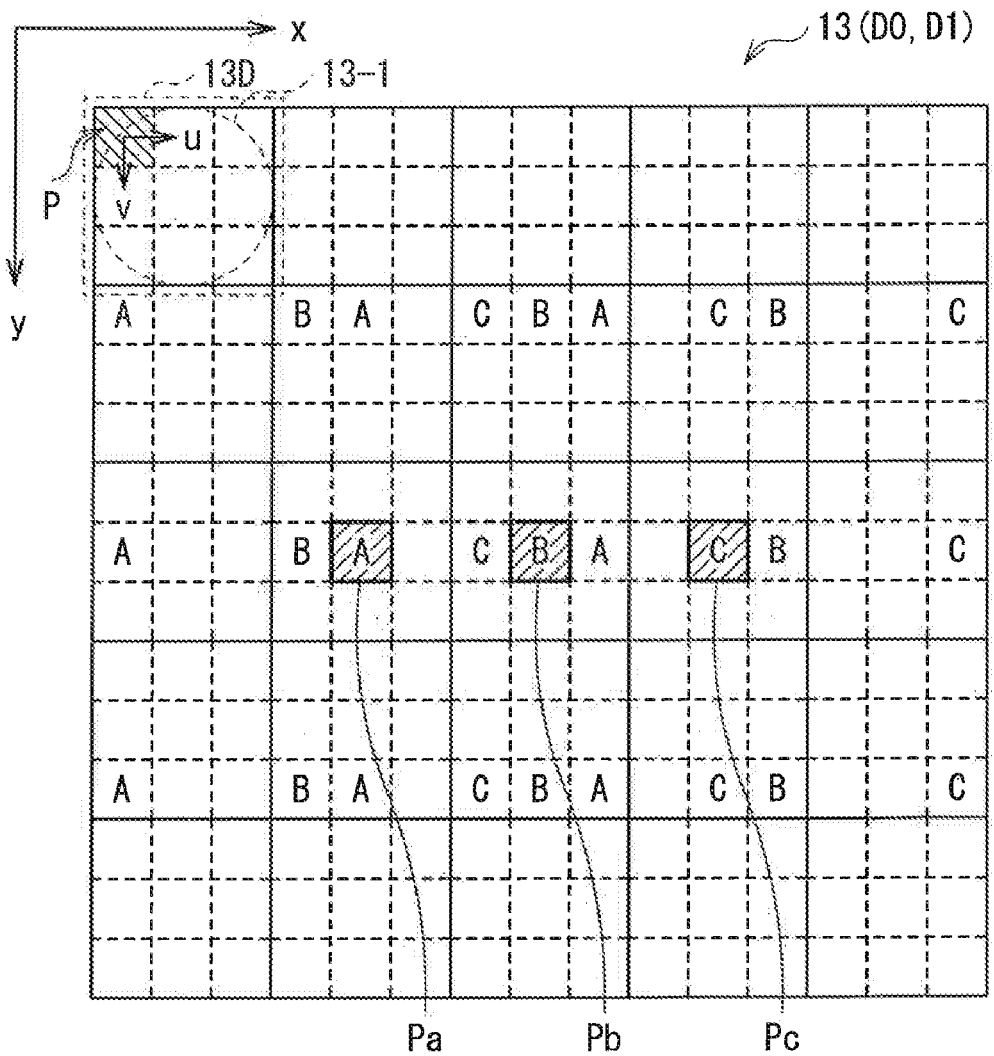
FIG. 8 is a schematic view of an arrangement example of pixel data during the refocusing arithmetic processing according to the comparative example illustrated in FIG. 7.
Figure 9:
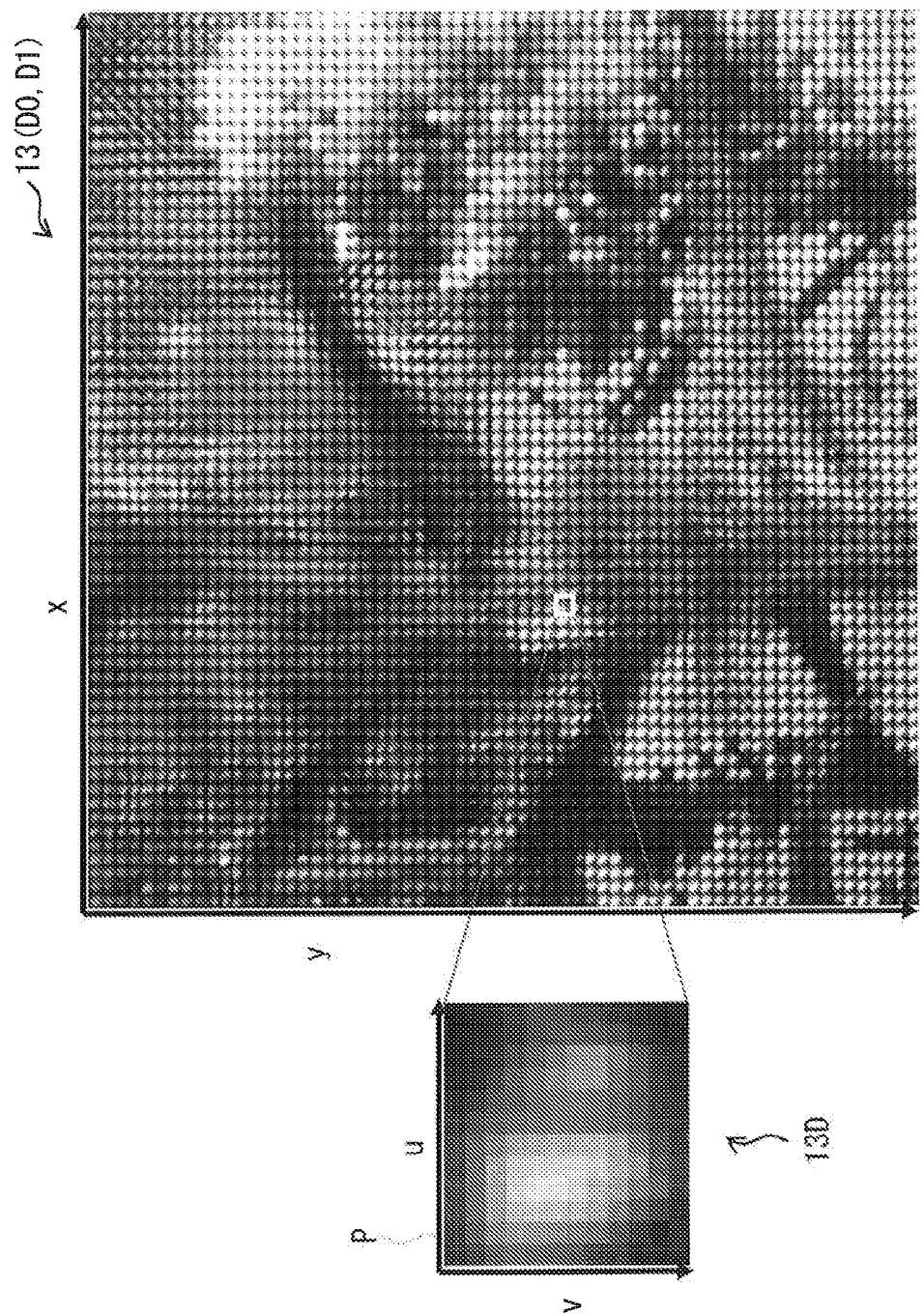
FIG. 9 is a photograph of an example of image pickup data used in the refocusing arithmetic processing according to the comparative example illustrated in FIG. 7.
Figure 10:
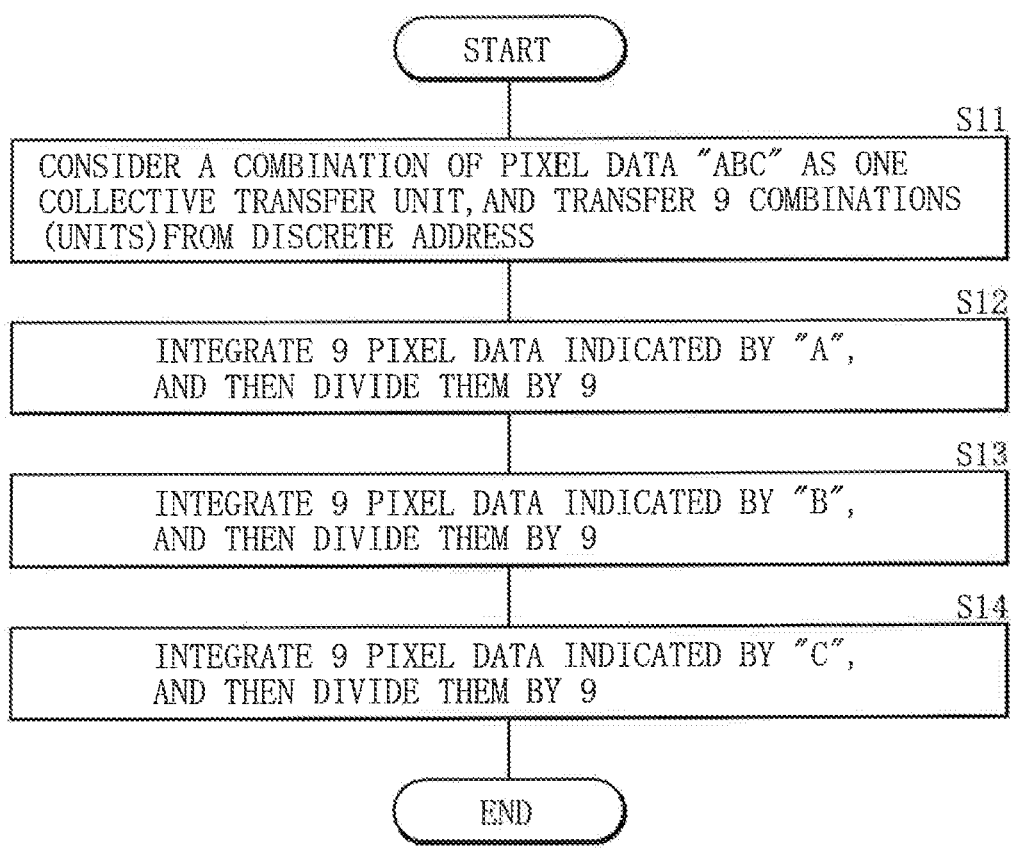
FIG. 10 is a flow chart of an example of refocusing arithmetic processing according to the embodiment.
Figure 11:
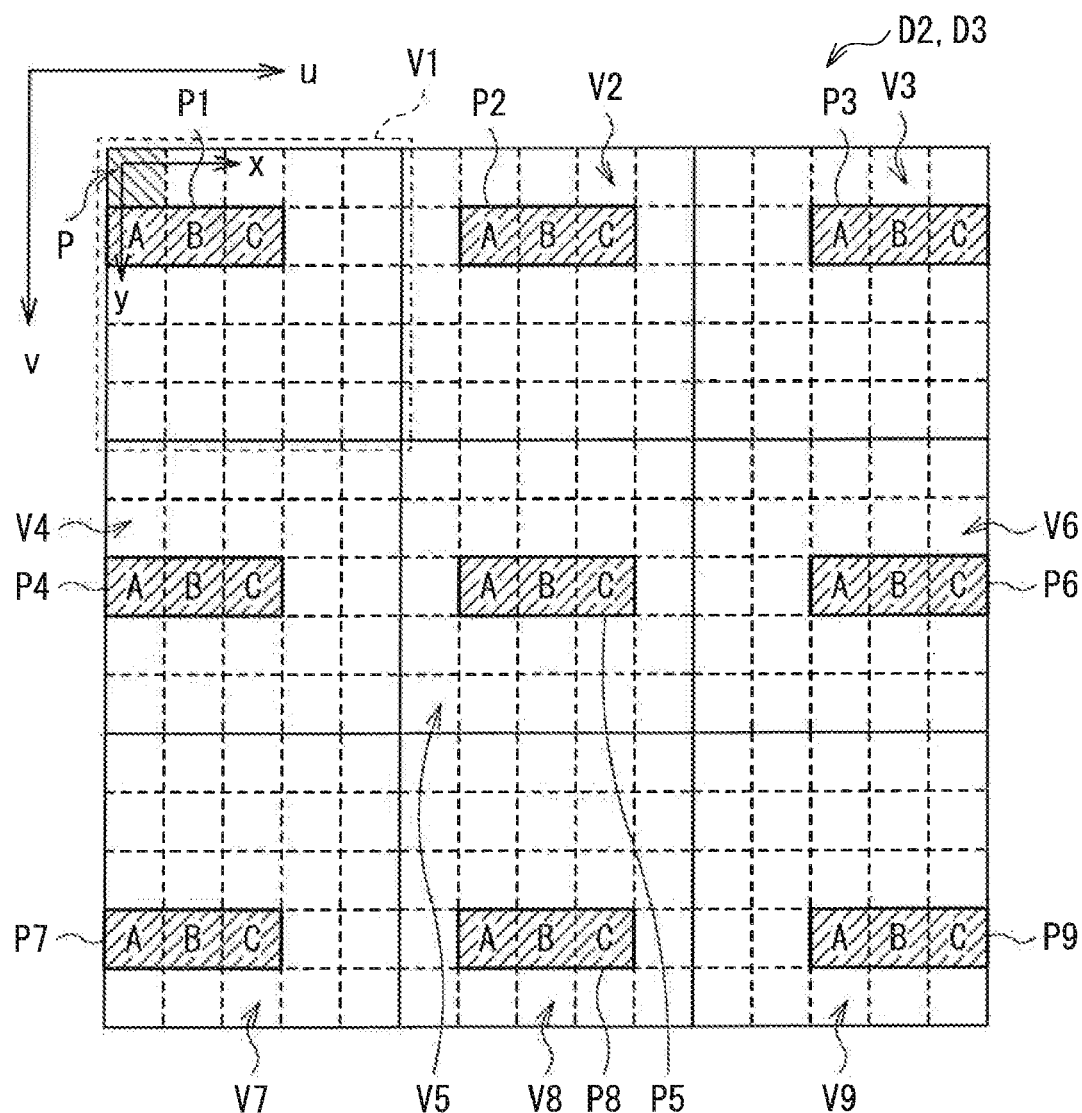
FIG. 11 is a schematic view of an arrangement example of pixel data during the refocusing arithmetic processing according to the embodiment illustrated in FIG. 10.
Figure 12:
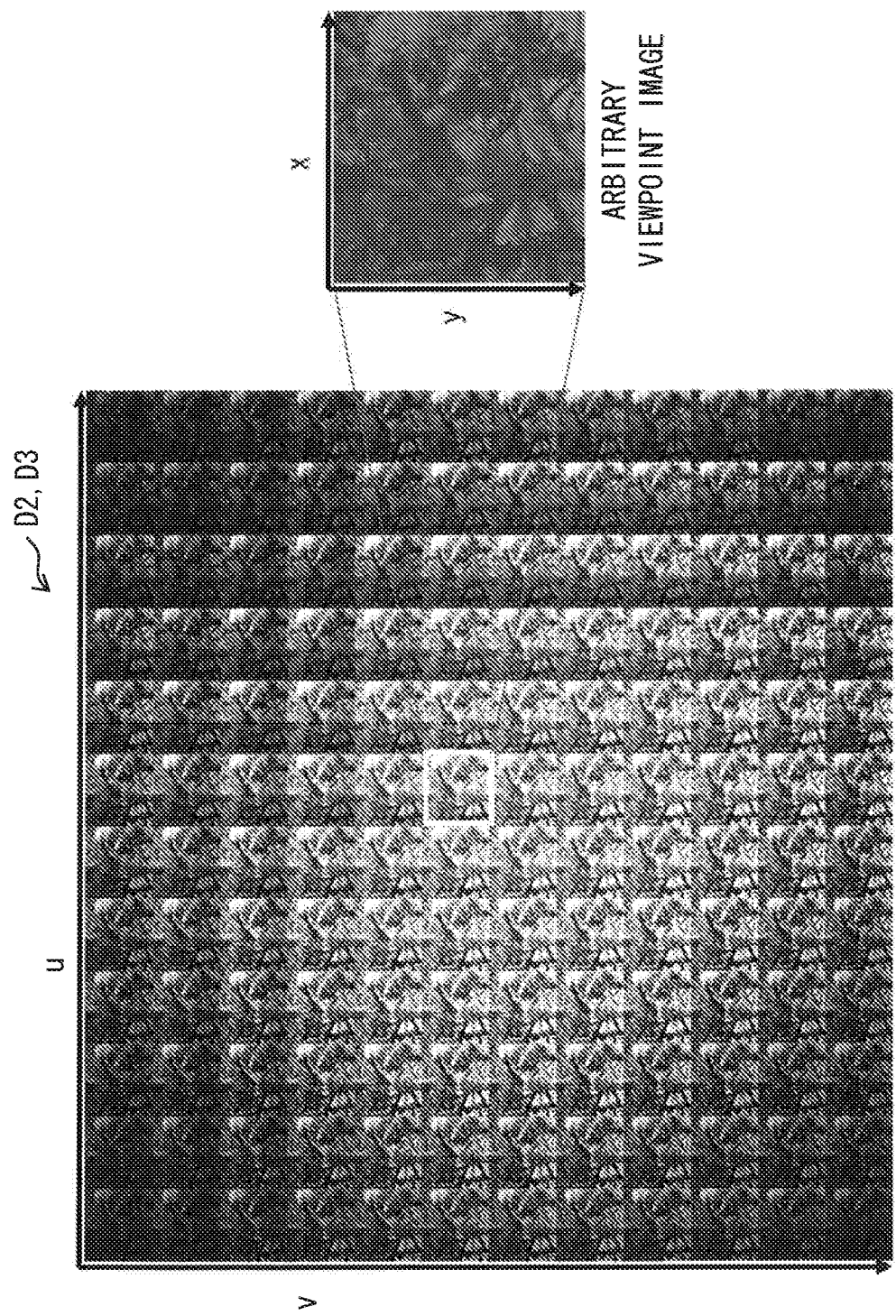
FIG. 12 is a photograph of an example of image pickup data used in the refocusing arithmetic processing according to the embodiment illustrated in FIG. 10.

Next, referring to FIGS. 7 to 12, characteristics functions (mainly refocusing arithmetic processing) in the image pickup apparatus 1 according to the embodiment will be described in detail in comparison with a comparative example. FIGS. 7 to 9 illustrate refocusing arithmetic processing in an image pickup apparatus (not illustrated) in related art according to the comparative example. FIGS. 10 to 12 illustrate an example of refocusing arithmetic processing in the image pickup apparatus 1 according to the embodiment. FIG. 7 illustrates a flow chart of an example of the refocusing arithmetic processing according to the comparative example, and FIG. 10 illustrates a flow chart of an example of the refocusing arithmetic processing according to the embodiment. FIG. 9 illustrates a photograph of an example of image pickup data used in the refocusing arithmetic processing according to the comparative example, and FIG. 12 illustrates a photograph of an example of image pickup data (image pickup data including arbitrary viewpoint images) used in the refocusing arithmetic processing according to the embodiment.

In the following description (FIGS. 7, 8, 10 and 11), the image pickup device 13 (the image pickup data D0 to D3) including M×N=15×15=225 pixels P is used as an example. Moreover, m×n=3×3=9 pixels P are allocated to each microlens in the microlens array 12. Therefore, the number of microlenses in the microlens array 12 is (15/3)×(15/3)=5×5=25. Further, as the arbitrary viewpoint images which will be described later, 9 arbitrary viewpoint images V1 to V9 are present, and 5×5=25 pixels P forms each arbitrary viewpoint image. In pixel data in each image pickup data, as described in FIG. 5, four-dimensional coordinates defined by each of coordinate systems (x, y, u, v) (coordinate axes) are set.

Refocusing Arithmetic Processing in Comparative Example

First, in the refocusing arithmetic processing in the comparative example, the case where pixel data in a refocus image is produced based on pixel data indicated by "A", "B" and "C" in FIG. 8 will be described. More specifically, the sorting process and integration process are performed on the pixel data indicated by "A", "B" and "C" so as to produce pixel data in the refocus image at pixel positions indicated by reference numerals Pa, Pb and Pc in the drawing.

First, as illustrated in FIG. 8, 9 pixel data indicated by "A" are located at pixel positions separated from one another, so 9 pixel data in discrete addresses are transferred from the data storage section to the reconstructed image synthesizing section. Then, these 9 pixel data are integrated, and then divided by 9, thereby pixel data in the refocus image is produced at a pixel position indicated by a reference numeral Pa in the drawing (step S91 in FIG. 7).

Next, as illustrated in FIG. 8, 9 pixel data indicated by "B" and 9 pixel data indicated by "C" are also located at pixel positions separated from one another, so these 9 pixel data indicated by "B" and these 9 pixel data indicated by "C" in discrete addresses are transferred from the data storage section to the reconstructed image synthesizing section. Then, these 9 pixel data indicated by "B" and these 9 pixel data indicated by "C" are integrated, and then divided by "9", thereby pixel data in the refocus image are produced at pixel positions indicated by reference numerals Pb and Pc in the drawing, respectively (steps S91 and S92). Thereby, the refocusing arithmetic processing illustrated in FIG. 7 is completed. Then, when such processing is repeated, the whole refocus image is produced.

In the refocusing arithmetic processing in the comparative example, pixel data indicated by "A", "B", "C" or the like which eventually form one pixel are divided into a plurality of pixel P in the image pickup data D0 and D1, and then stored in the data storage section. Therefore, to produce the refocus image, it is necessary to collect pixel data from discrete pixel positions (address) in such a data storage section. Therefore, the number of data transfer cycles is extremely large (in this case, 9 cycles×3=27 cycles), so transfer efficiency is extremely poor, so it takes time to produce the refocus image.

Refocusing Arithmetic Processing in Embodiment

On the other hand, in the refocusing arithmetic processing in the embodiment, first, in the sorting section 142, a predetermined sorting process is performed on the image pickup data D1 so as to produce image pickup data D2 including a plurality of arbitrary viewpoint images. More specifically, for example, pixel data extracted from pixels P located at the same position in the reconstructed pixel regions 13D illustrated in FIG. 8 are synthesized so as to produce the arbitrary viewpoint image. Thereby, for example, a plurality of arbitrary viewpoint images as illustrated in FIGS. 11 and 12 are produced. Each pixel data indicated by each of "A", "B" and "C" in FIG. 8 has the following four-dimensional coordinates (x, y, u, v). Therefore, a coordinate system (x, y) and a coordinate system (u, v) are converted (exchanged) between the image pickup data D0 and D1 (refer to FIG. 8) and the image pickup data D2 and D3 including the arbitrary viewpoint images (refer to FIG. 11) so as to produce the arbitrary viewpoint images V1 to V9 as illustrated in FIG. 11.

Pixel indicated by "A": (x, y, u, v)=(0, 1, 0, 0), (1, 1, 1, 0), (2, 1, 2, 0), (0, 2, 0, 1), (1, 2, 1, 1), (2, 2, 2, 1), (0, 3, 0, 2), (1, 3, 1, 2), (2, 3, 2, 2)

Pixel data indicated by "B": (x, y, u, v)=(1, 1, 0, 0), (2, 1, 1, 0), (3, 1, 2, 0), (1, 2, 0, 1), (2, 2, 1, 1), (3, 2, 2, 1), (1, 3, 0, 2), (2, 3, 1, 2), (3, 3, 2, 2)

Pixel data indicated by "C": (x, y, u, v)=(2, 1, 0, 0), (3, 1, 1, 0), (4, 1, 2, 0), (2, 2, 0, 1), (3, 2, 1, 1), (4, 2, 2, 1), (2, 3, 0, 2), (3, 3, 1, 2), (4, 3, 2, 2)

Then, in the embodiment, the image pickup data D2 is stored in the data storage section 17 so that in each of the arbitrary viewpoint images V1 to V9 produced in such a manner, pixel data (a plurality of pixel data) from a plurality of pixels P are recorded at pixel positions (addresses) adjacent to one another. More specifically, in each of the arbitrary viewpoint images V1 to V9 in the image pickup data D2, as indicated by reference numerals P1 to P9 in FIG. 11, pixel data indicated by "A", "B" and "C" illustrated in FIG. 8 are stored at adjacent and contiguous pixel positions (addresses) with an identical arrangement. Moreover, in this case, pixel data lines with an arrangement of "ABC" indicated by reference numerals P1 to P9 are arranged along an x-axis direction in the arbitrary viewpoint images V1 to V9, and the position of the pixel data line is sequentially shifted in the x-axis direction and a y-axis direction in the arbitrary viewpoint images.

Therefore, in the embodiment, next, in the reconstructed image synthesizing section 145, refocusing arithmetic processing which will be described below is performed using the image pickup data D2 and D3 including such arbitrary viewpoint images V1 to V9. Specifically, the reconstructed image synthesizing section 145 collectively reads out a plurality of pixel data as a read-out unit stored at pixel positions (addresses) adjacent to one another in each of the arbitrary viewpoint images V1 to V9. More specifically, a combination (a pixel data line) of pixel data "ABC" indicated by each of the reference numerals P1 to P9 in FIG. 11 is considered as one collective transfer unit, and 9 combinations (9 units) are transferred from discrete addresses in the arbitrary viewpoint images (step S11 in FIG. 10).

Then, 9 pixel data from each of "A", "B" and "C" are integrated, and then divided by 9, thereby the pixel data in the refocus image is produced (step S12 to S14). In other words, the reconstructed image synthesizing section 145 performs the sorting process and the integration process on a plurality of pixel data read out from the arbitrary viewpoint images V1 to V9 in pixel data from each of "A", "B" and "C" so as to produce the refocus image. Thereby, the refocusing arithmetic processing illustrated in FIG. 10 is completed. Then, when such processing is repeated, the whole refocus image forming the image pickup data D4 is produced.

Thus, in the refocusing arithmetic processing in the embodiment, the image pickup data D2 including a plurality of arbitrary viewpoint images V1 to V9 is produced based on the image pickup data D0 obtained from the image pickup device 13, and then stored in the data storage section 17. After that, a plurality of pixel data stored in adjacent pixel positions (addresses) are collectively read out from each of the arbitrary viewpoint images V1 to V9 so as to produce the refocus image forming the image pickup data D4. Thereby, the number of data transfers (the number of data transfer cycles) from the data storage section 17 to the image processing section 14 which are necessary to produce the refocus image is smaller than that in related art. More specifically, while in the comparative example, 9 data transfers×3=27 data transfers are necessary, in the embodiment, only 9 data transfers×1=9 data transfers are necessary (in this case, only ⅑ of the number of data transfers in the comparative example is necessary).

As described above, in the embodiment, when the refocus image is produced based on the image pickup data D0 obtained from the image pickup device 13, a plurality of arbitrary viewpoint images V1 to V9 are produced based on the image pickup data D0 to be stored in the data storage section 17, and then a plurality of pixel data recorded at adjacent pixel positions (addresses) are collectively read out from each of the arbitrary viewpoint images V1 to V9. Therefore, the number of data transfers from the data storage section 17 which are necessary to produce the refocus image based on such a plurality of pixel data is smaller than that in related art. Therefore, an image (a refocus image) set from an arbitrary focal point is allowed to be produced at higher speed than that in related art based on the image pickup data D0 obtained so as to also include information on the traveling direction of a light ray.

2. Application Example of Image Pickup Apparatus

The image pickup apparatus according to the embodiment of the invention is applicable as image pickup apparatuses for a digital camera 3 (Application Example 1) and a three-dimensional display (Application Example 2) which will be described below, and a camcorder, a position sensor, a biosensor, an optical microscope, a FTV (Free viewpoint TV) and the like.

Application Example 1

Figure 13A:
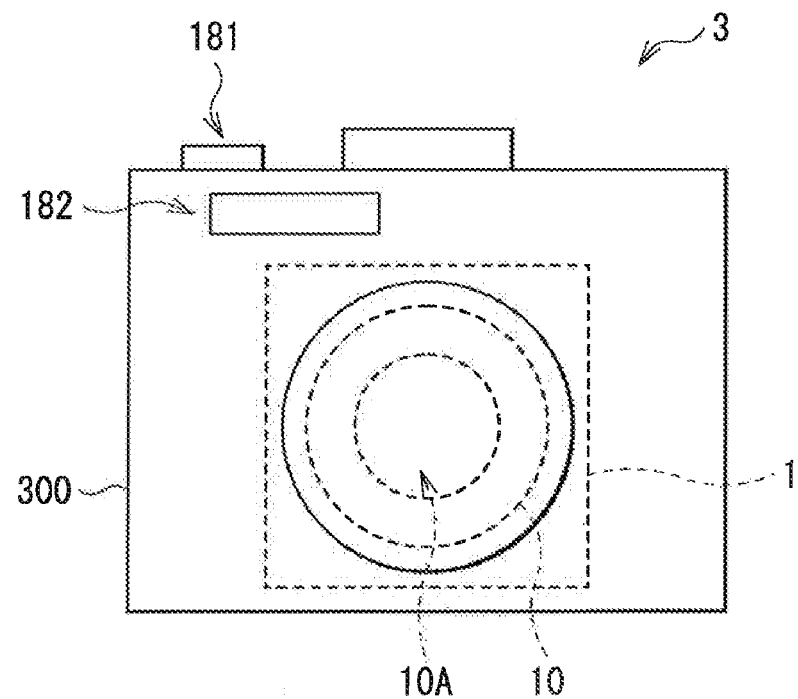
FIGS. 13A and 13B are illustrations of external configurations of a digital camera according to Application Example 1 of an image pickup apparatus according to the embodiment of the invention.
Figure 13B:
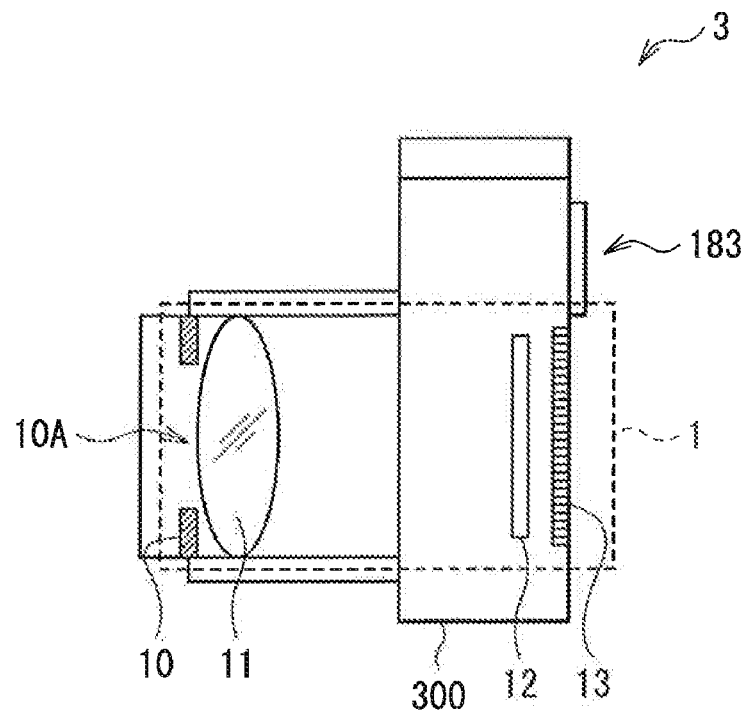

FIGS. 13A and 13B illustrate a schematic configuration of the digital camera 3 including the image pickup apparatus 1, and FIGS. 13A and 13B are a front view and a side view, respectively. The digital camera 3 includes the image pickup apparatus 1 according to the above-described embodiment in an enclosure, and a shutter 181, a flash 182, a finder optical system 183 and the like are arranged on a top part of the enclosure 300.

Application Example 2

Moreover, the image pickup apparatus according to the embodiment of the invention is applicable to, for example, a stereo system three-dimensional image display. For example, typical stereo system three-dimensional image display is achieved as will be described below. For example, when two images (two parallax images) for right and left eyes taken by two cameras corresponding to human eyes are simultaneously projected on a screen, and a picture on the screen is viewed by a user wearing a pair of polarized glasses, such three-dimensional image display is achieved. At this time, polarized light rays orthogonal to each other as projection light for the right eye and projection light for the left eye are used in two projectors, and as the pair of polarized glasses, a pair of polarized glasses which allow only polarized light rays orthogonal to each other at the right and left eyes to pass therethrough are used. Thereby, when the images for the right and left eyes are viewed by the right and left eyes, respectively, the user recognizes the images as a stereoscopic image with a sense of depth.

In the case where the images obtained in the above-described embodiment are used for such stereo system three-dimensional display, two arbitrary viewpoint images (parallax images) for the right and left eyes are produced, and the produced parallax images are projected on a screen with the above-described projectors, and then the images are viewed by a user wearing a pair of polarized glasses, thereby three-dimensional image display is achieved. Thus, parallax images for the right and left eyes are obtainable without using two cameras. Therefore, a three-dimensional display system with a simple configuration and sufficient display quality is achievable. However, the parallax images for the right and left eyes may be obtained through the use of two cameras.

3. Modification

Although the present invention is described referring to the embodiment and the application examples, the invention is not limited thereto, and may be variously modified.

Figure 14A:
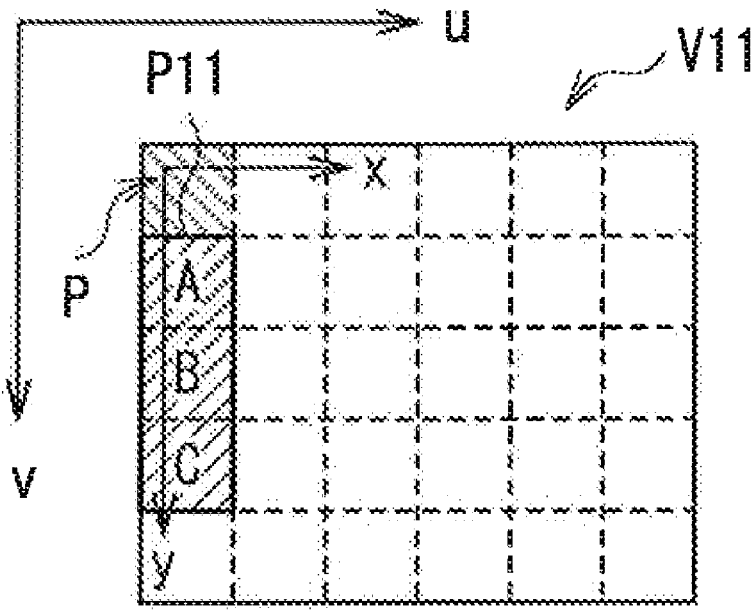
FIGS. 14A and 14B are schematic views for describing a collective transfer unit of pixel data in an arbitrary viewpoint image in refocusing arithmetic processing according to a modification of the invention.
Figure 14B:
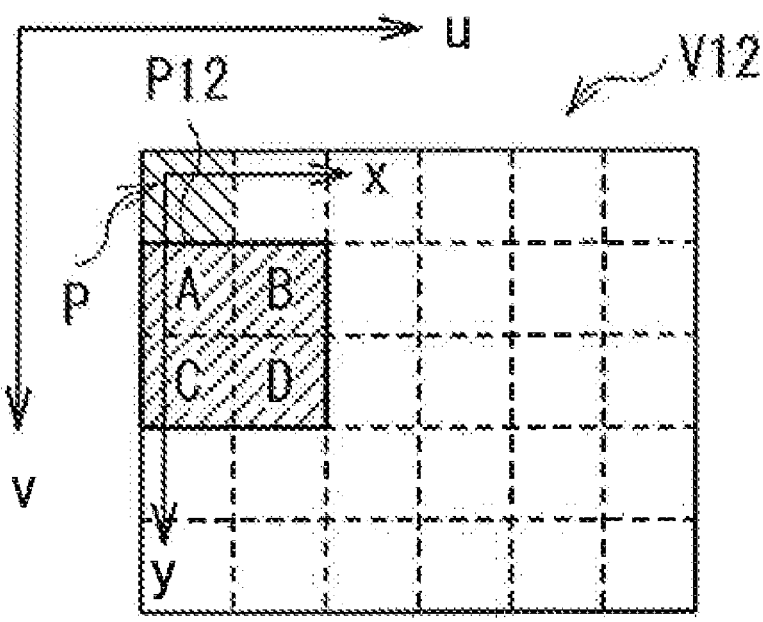

For example, in the above-described embodiment or the like, the case where the pixel data lines including the arrangement of "ABC" indicated by the reference numerals P1 to P9 in FIG. 11 are arranged along the x-axis direction in the arbitrary viewpoint images V1 to V9 is described, but the invention is not limited thereto. More specifically, for example, like an arbitrary viewpoint image V11 illustrated in FIG. 14A, a pixel data line including an arrangement of "ABC" indicated by P11 may be arranged along the y-axis direction in the arbitrary viewpoint image V11. Moreover, for example, like an arbitrary viewpoint image V12 illustrated in FIG. 14B, a pixel data line including an arrangement of "ABCD" indicated by P12 may be arranged along both of the x-axis direction and the y-axis direction in the arbitrary viewpoint image V12.

Moreover, in the above-described embodiment or the like, the image processing section 14 is described as one component of the image pickup apparatus 1. However, the image processing section is not necessarily arranged in the image pickup apparatus. More specifically, the image processing section may be arranged in any apparatus other than the image pickup apparatus, for example, a PC (Personal Computer) or the like so that image pickup data obtained in the image pickup apparatus is transferred to the PC and image processing is performed on the image pickup data in the PC.

In addition, in the above-described embodiment or the like, the aperture stop 10 is positioned at a side closer to the image pickup object 2 (an incident side) of the image pickup lens 11, but the invention is not limited thereto, and the aperture stop 10 may be arranged on an image side (an exit side) of the image pickup lens 11 or in the image pickup lens 11.

Moreover, on the light-receiving plane of the image pickup device 13, for example, different color filters (not illustrated) are two-dimensionally arranged for pixels P, respectively. As such color filters, color filters (primary color filters) in a Bayer pattern in which filters of three primary colors, that is, red (R), green (G) and blue (B) are arranged in a checkered pattern at a ratio of R:G:B=1:2:1 are applicable. When such color filters are arranged, image pickup data D0 obtained from the image pickup device 13 is allowed to be pixel data of a plurality of colors (in this case, three primary colors) corresponding to the colors of the color filters, and the reconstructed image is allowed to be a color image. Further, in the case where color filters of which colors are allocated to pixel regions corresponding to microlenses, respectively, are used, when data from pixels located at the same position in the pixel regions each of which corresponds to each of microlenses are extracted, the same color arrangement as that of the color filters is obtainable even after extraction. Therefore, a process such as color interpolation is easily performed, and the occurrence of false color is preventable.

The present application contains subject matter related to that disclosed in Japanese Priority Patent Application JP 2009-024469 filed in the Japan Patent Office on Feb. 5, 2009, the entire content of which is hereby incorporated by references.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus comprising:
   an image pickup lens;
   an image pickup device obtaining image pickup data based on light received;
   a microlens array including a plurality of microlenses, and arranged on a focal plane of the image pickup lens between the image pickup lens and the image pickup device, each of the microlenses being provided corresponding to a plurality of pixels of the image pickup device, the plurality of pixels for each of the plurality of microlenses is arranged in an x-y matrix of pixel positions where x and y are integers of at least 3;
   an image processing section performing predetermined image processing so as to produce a reconstructed image based on the image pickup data obtained from the image pickup device; and
   a data storage section for storing image pickup data during image processing by the image processing section,
   wherein when the image processing section produces a refocus image as a reconstructed image set from an arbitrary focal point based on the image pickup data, a plurality of arbitrary viewpoint images are produced based on the image pickup data by synthesizing pixel data extracted from pixels located at the same position in image regions each of which corresponds to each of the microlenses, and the arbitrary viewpoint images are stored in the data storage section and are arranged in a m-n matrix of arbitrary viewpoint image locations where m and n are integers of at least two,
   a plurality of pixel data recorded at pixel positions adjacent and contiguous to one another are collectively read out as a read-out unit from each of the arbitrary viewpoint images stored in the data storage section,
   a first read-out unit associated with a first arbitrary viewpoint image located at a 1-1 arbitrary viewpoint image location is read out therefrom, a second read-out unit associated with a second arbitrary viewpoint image located at a 1-2 arbitrary viewpoint image location is read out therefrom and a third read-out unit associated with a third arbitrary viewpoint image located at a 2-1 arbitrary viewpoint image location is read out therefrom with the second read-out unit shifted one pixel position in an x direction in the second arbitrary view point image relative to the first read-out unit in the first arbitrary viewpoint image and the third read-out unit is shifted one pixel position in a y direction in the third arbitrary viewpoint image relative to the first read-out unit in the first arbitrary viewpoint image, and
   a predetermined sorting process a predetermined integration process are performed on the pixel data read out, thereby the refocus image is produced.

2. The image pickup apparatus according to claim 1, wherein
   the image processing section includes:
   an arbitrary viewpoint image producing section producing the plurality of arbitrary viewpoint images based on the image pickup data, and
   a refocus image producing section producing the refocus image based on the plurality of pixel data read out from each of the arbitrary viewpoint images stored in the data storage section.

3. The image pickup apparatus according to claim 2, wherein
   the refocus image producing section performs the sorting process and the integration process on each of the plurality of pixel data read out from each of the arbitrary viewpoint images so as to produce the refocus image.

4. The image pickup apparatus according to claim 1, wherein
   the image processing section collectively reads out the plurality of pixel data adjacent and contiguous to one another along one or more pixel directions from each of the arbitrary viewpoint images stored in the data storage section.

5. The image pickup apparatus according to claim 4, wherein
   the image processing section collectively reads out the plurality of pixel data adjacent and contiguous to one another along two pixel directions different from each other from each of the arbitrary viewpoint images stored in the data storage section.

* * * * *